(No Model.)

J. PORTEOUS.
DIRT SCRAPER.

No. 275,075. Patented Apr. 3, 1883.

Witnesses,

Inventor
James Porteous
By Dewey & Co
Attorneys

UNITED STATES PATENT OFFICE.

JAMES PORTEOUS, OF FRESNO, CALIFORNIA.

DIRT-SCRAPER.

SPECIFICATION forming part of Letters Patent No. 275,075, dated April 2, 1883.

Application filed December 12, 1882. (No model.)

*To all whom it may concern:*

Be it known that I, JAMES PORTEOUS, of Fresno, county of Fresno, State of California, have invented an Improved Dirt-Scraper; and I hereby declare the following to be a full, clear, and exact description thereof.

My invention relates to certain new and useful improvements in dirt-scrapers; and these improvements consist in a means for limiting the throw or dump of the bowl, whereby the tail lever or handle is prevented from striking or getting in the way of the horses, and in a means for raising the edge or bit of the bowl when in this limited dumped position, in order that it may not drag along the ground, as hereinafter described.

The object of my invention is to provide a simple, light, and effective scraper for leveling land.

Figure 1:
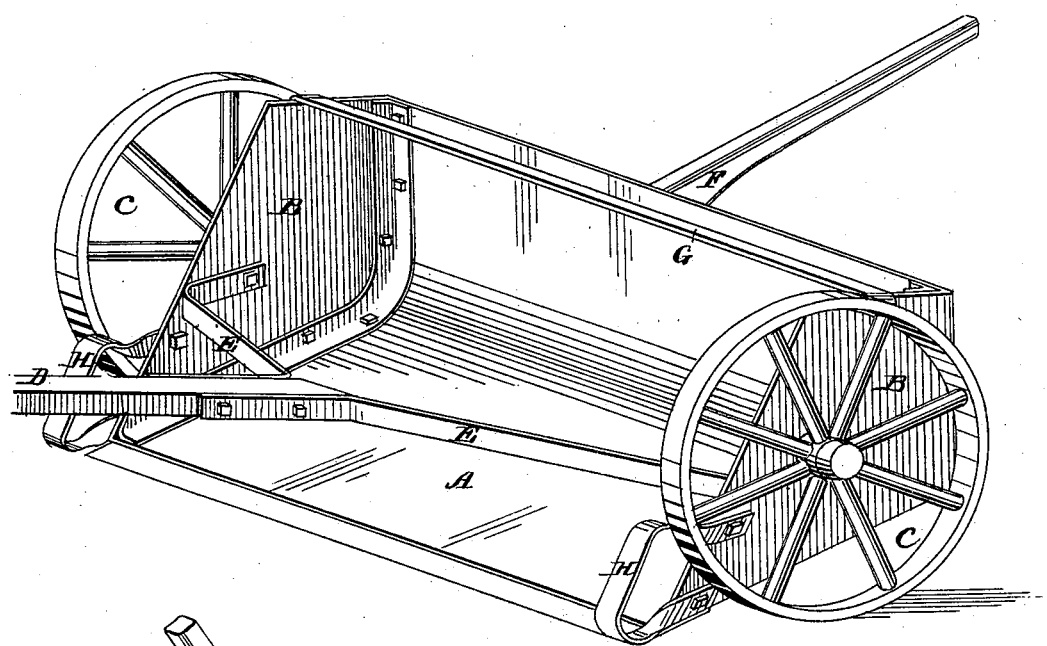
Figure 2:
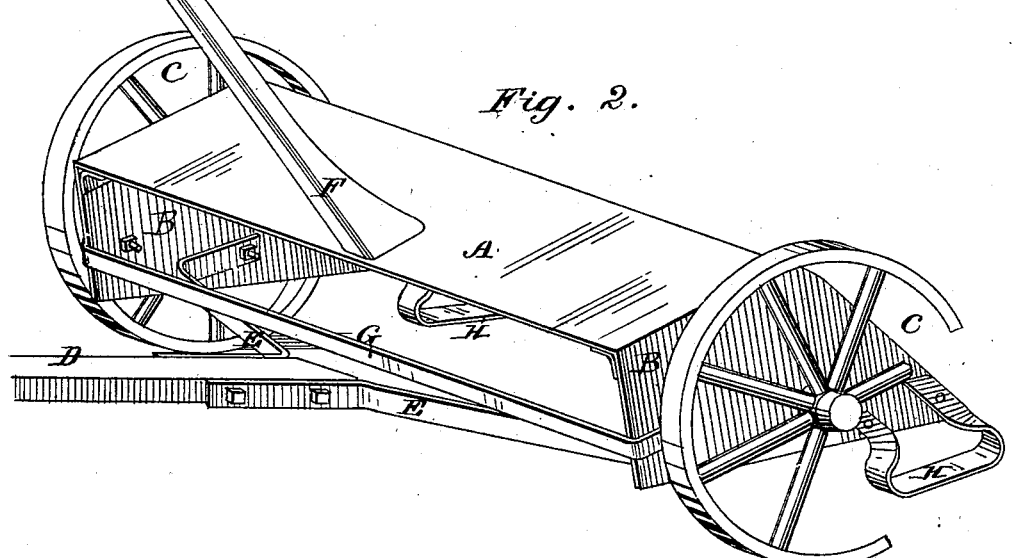

Referring to the accompanying drawings, Figure 1 is a perspective view of my device. Fig. 2 is a like view of the same dumped.

Let A represent the bowl of the device, having ends B, in which are suitably mounted the wheels C, which raise the base of the bowl from the ground when carrying dirt.

D is the tongue-pole, and E E are connecting-strips pivoted to the inner sides of the ends B of the bowl, and joining the tongue or pole to said bowl. By pivoting the strips E to the bowl the latter may be dumped without affecting the pole.

Secured to the rear top center of the bowl, and extending rearwardly, is the handle F. When the horses are hitched to the pole, and the scraper moves along until it reaches the place where the earth is to be scraped, the handle F is slightly lifted, whereby the bit or lower edge of the bowl is thrown down to take hold of the ground. When loaded, instead of dragging along, pushing the earth before it, the handle F is pulled down, the bit raised, and the bowl righted upon its wheels. When the dumping-place is reached the handle is again thrown up, the bit sticks in the ground, and the bowl turns over or dumps. The handle, being fast to the bowl, turns over with it, and were there no limit to the throw it would strike or fall down in the way of the horses, as this handle should be made long enough to provide good leverage; but I have a means to limit this throw. It consists of the cross-bar G, secured upon top of the sides B of the bowl. The position forward or back of this bar gives more or less throw to the bowl. It limits the throw by coming in contact with the strips E E, as is shown in Fig. 2. In this position it will dump all its dirt; but the handle F is held up above the horses and is not in their way. In wide machines, where I would have to use a cross-bar on the pole, the cross-bar G would strike the pole-bar to have the same effect; but because I have this stop, and limit the throw of the bowl, I have to overcome another difficulty. The bowl, when stopped, is not sufficiently thrown to remove its bit and the lower edges of its ends from the ground, and these will consequently drag along. This is undesirable, because almost all the transportation of the scraper is in a dumped position, and this constant dragging would soon wear and dull the bit. To prevent this, and to raise the edge from the ground when in a dumped position, I have the side runners or shoes, H. These consist of steel pieces secured to the ends B and projecting forward a short distance, as seen in Fig. 1, when the scraper is right side up; but when the bowl is dumped, as shown in Fig. 2, these runners or shoes are on the ground, and raise the rear edge or bit of the bowl up from the ground.

Having thus described my invention, what I claim as new, and desire to secure by Letters Patent, is—

1. In a dirt-scraper, the bowl A and rear handle, F, in combination with a cross-bar, G, for limiting the throw or dump of the bowl to prevent the handle from swinging forward in the way of the horses, substantially as described.

2. In a dirt-scraper, the bowl A, rear handle, F, tongue or pole D, and pivoted connecting-strips E E, in combination with cross-bar G on the bowl, adapted to come in contact with the connecting-strips E to limit the throw or dump of the bowl, substantially as and for the purpose herein described.

3. In a dirt-scraper, the bowl A, having ends B, handle F, pole D, and connecting-strips E E, in combination with the cross-bar G on ends B, substantially as and for the purpose herein described.

4. In a dirt-scraper, the bowl A and handle F, and cross-bar G, limiting the dump or throw of the bowl, for the purpose described, in combination with a means for raising the bit and ends of the bowl from the ground when said bowl is dumped, substantially as herein described.

5. In a dirt-scraper, the bowl A and handle F, and cross-bar G, for limiting the dump or throw of the bowl, for the purpose described, in combination with the flat runners H, adapted to raise the bit and ends of the bowl off the ground when said bowl is dumped, substantially as herein described.

6. The dirt-scraper herein described, consisting of the bowl A, with ends B, wheels C, handle F, pole D, strips E E, and stop-bar G, and the runners H, all arranged and operating substantially as described.

In witness whereof I hereunto set my hand.

JAMES PORTEOUS.

Witnesses:
M. K. HARRIS,
C. W. DE LONG.